US009921563B2

(12) United States Patent
Viste

(10) Patent No.: US 9,921,563 B2
(45) Date of Patent: Mar. 20, 2018

(54) SYSTEM FOR UPDATING A CONTROL PROGRAM ACTIVELY CONTROLLING AN INDUSTRIAL PROCESS

(71) Applicant: Rockwell Automation Technologies, Inc., Mayfield, OH (US)

(72) Inventor: Michael J. Viste, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 280 days.

(21) Appl. No.: 14/873,386

(22) Filed: Oct. 2, 2015

(65) Prior Publication Data
US 2017/0097624 A1 Apr. 6, 2017

(51) Int. Cl.
*G05B 19/042* (2006.01)
*G06F 9/445* (2018.01)

(52) U.S. Cl.
CPC ..... *G05B 19/0426* (2013.01); *G06F 9/44526* (2013.01); *G05B 2219/23333* (2013.01)

(58) Field of Classification Search
None
See application file for complete search history.

(56) References Cited

U.S. PATENT DOCUMENTS

| 2008/0208363 A1* | 8/2008 | Grgic | G05B 19/042 700/2 |
| 2009/0192645 A1* | 7/2009 | Govindaraj | G05B 19/0426 700/110 |
| 2010/0082133 A1* | 4/2010 | Chouinard | G06F 8/20 700/86 |

FOREIGN PATENT DOCUMENTS

| EP | 0665496 A1 | 8/1995 |
| EP | 1650618 A2 | 4/2006 |
| EP | 3059647 A2 | 8/2016 |

OTHER PUBLICATIONS

EP Search Report for Application No. 16192240.6; dated Mar. 1, 2017.
Rockwell Automation; Logix5000 Controllers Add on Instructions, Programming Manual; Rockwell Automation Publication 1756-PM010F-EN-P; Oct. 2014; pp. 1-104; USA.

* cited by examiner

*Primary Examiner* — Tuan Dao
(74) *Attorney, Agent, or Firm* — Boyle Fredrickson, SC

(57) ABSTRACT

The inventor has recognized that industrial controllers may be updated after they are deployed in the field, while actively controlling an industrial process and without costly downtime, by storing a replacement machine-readable component in an allocated program space, locating and modifying one or more dependent machine-readable components copied in the allocated program space to instead depend on the replacement machine-readable component, re-linking a copy of the control program in the allocated program space, and redirecting execution to the control program in the allocated program space. Replacement machine-readable components could be instructions, libraries, or subroutines of the control program, and are not limited to user logic. The control program in the allocated program space may optimally be tested by verifying an operation before redirecting execution to the control program in the allocated program space.

20 Claims, 5 Drawing Sheets

SYSTEM FOR UPDATING A CONTROL PROGRAM ACTIVELY CONTROLLING AN INDUSTRIAL PROCESS

FIELD OF THE INVENTION

The present invention is directed to the field of industrial controllers, and more particularly, to systems and methods for updating a control program actively controlling an industrial process.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine. The Logix5000 Controllers from Rockwell Automation, Inc. of Milwaukee, Wis. are exemplar of such industrial controllers.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP. DeviceNet and ControlNet) differ from standard communication networks (such as Ethernet) by guaranteeing maximum communication delays by pre-scheduling the communication capacity of the network, and/or providing redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

After industrial controllers are deployed in the field and operating to actively control industrial processes or machines, subsequently updating the industrial controllers can be difficult. Updates might be recommended or required by vendors to address any number of issues, such as correcting an instruction or library having an anomaly first noticed in the field, or extending an instruction or library to provide greater functionality as later determined in the field. Installing such updates typically requires updating (or re-flashing) firmware of the industrial controllers, and updating firmware typically requires temporary downtime for the industrial controllers.

However, interrupting control of an industrial process is oftentimes costly and therefore undesirable. For example, if an industrial controller is actively controlling an assembly line producing articles, every minute the industrial controller is taken down, the assembly line may lose production a quantifiable number of articles from production. Consequently, entities operating industrial controllers must often decide whether the benefits of industrial controller updates outweigh the costs, and if so, the optimal date/time for updating industrial controllers with the least impact on cost.

It some instances, it may be possible to update user logic of industrial controllers online, such as Online Editing or Partial Import Online. However, updating with such tools online is typically limited to only the logic created by the user.

What is needed is a mechanism by which industrial controllers may be conveniently updated after they are deployed in the field without requiring costly downtime and/or being limited to user logic.

SUMMARY OF THE INVENTION

The inventor has recognized that industrial controllers may be updated after they are deployed in the field, while actively controlling an industrial process and without costly downtime, by storing a replacement machine-readable component in an allocated program space, locating and modifying one or more dependent machine-readable components copied in the allocated program space to instead depend on the replacement machine-readable component, re-linking a copy of the control program in the allocated program space, and redirecting execution to the control program in the allocated program space. Replacement machine-readable components could be instructions, libraries, or subroutines of the control program, and are not limited to user logic. The control program in the allocated program space may optimally be tested by verifying an operation before redirecting execution to the control program in the allocated program space.

An aspect of the invention provides a means to update industrial controllers, such as Logix controllers, in between releases while the controller is operational (e.g., controlling a production line). The scope of that which can be updated includes any controller behavior (including instructions) implemented as (1) loadable libraries and (2) inline code. Different component patching processes could be followed, such as for library patching and inline patching.

In one aspect, a library patching process might include: (1) download the library, (2) find any libraries which are dependent on the library being replaced, (3) download the library dependents, (4) download the user logic, (5) test the patch to make sure it works as expected, (6) accept the patch, and (7) make the patch permanent.

In another aspect, an inline patching process might include: (1) change the system component (i.e., install the patch), (2) find any User Logic components which are dependent on the system component being changed, (3) mark desired components (all or selected ones) dirty, (4) rebuild the dirty components, (5) download the user logic, (6) test the patch to make sure it works as expected, (7) accept the patch, and (8) make the patch permanent.

Accordingly, a mechanism for providing an online update for industrial controllers is provided. The industrial controllers may be updated without requiring a halt to re-flash firmware (and resulting downtime of an industrial process). Updates can change how a behavior works either in specific targeted areas, such as via Add-On instructions ("AOI"), or throughout all user logic. Updates may be performed immediately or on subsequent downloads. A narrow slice of behavior can be updated, and entities need not upgrade an industrial controller's firmware in its entirety while online. Moreover, there may be less risk and disruption in being able to modify a small chunk of code as described herein.

Specifically then, one aspect of the present invention provides an industrial control system including an industrial controller executing a control program for actively controlling an industrial process. The industrial controller may execute to: (a) store a first machine-readable component in an allocated program space, the first machine-readable component being stored to replace a second machine-readable component supporting the control program; (b) locate a dependent machine-readable component having a data dependency on the second machine-readable component, and copy the dependent machine-readable component to the allocated program space; (c) modify the dependent machine-readable component in the allocated program space to change the data dependency on the second machine-readable component to a data dependency on the first machine-readable component; (d) copy the control program to the allocated program space, and link the control program in the allocated program space with the first machine-readable component and the dependent machine-readable component in the allocated program space; (e) execute the control program in the allocated, program space to verify an operation; and (f) after successfully verifying the operation, and while the control program is actively controlling the industrial process, redirect execution of the control program to execution of the control program in the allocated program space.

The first and second machine-readable components could be first and second libraries including non-volatile resources operable to be used by the control program. Alternatively, the first and second machine-readable components could be first and second instructions operable to be used by the control program, and the first and second instructions could be Add-On Instructions customized for the industrial process. Alternatively, the first and second machine-readable components could be first and second subroutines of the control program (part of the user logic).

The dependent machine-readable component could be an instruction operable to be used by the control program or a library including non-volatile resources operable to be used by the control program. The industrial controller could also execute to locate a plurality of dependent machine-readable components, each of the plurality of dependent machine-readable components having a data dependency on the second machine-readable component; and copy the plurality of dependent machine-readable components to the allocated program space.

Another aspect of the present invention may provide a method for updating an industrial control system executing a control program actively controlling an industrial process. The method may include: (a) storing a first machine-readable component in an allocated program space, the first machine-readable component being stored for replacing a second machine-readable component; (b) locating a dependent machine-readable component having a data dependency on the second machine-readable component, and copying the dependent machine-readable component to the allocated program space; (c) modifying the dependent machine-readable component in the allocated program space to change the data dependency on the second machine-readable component to a data dependency on the first machine-readable component; (d) copying the control program to the allocated program space, and linking the control program in the allocated program space with the first machine-readable component and the dependent machine-readable component in the allocated program space; (e) executing the control program in the allocated program space to verify an operation; and (f) after successfully verifying the operation, and while the control program is actively controlling the industrial process, redirecting execution of the control program to execution of the control program in the allocated program space.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
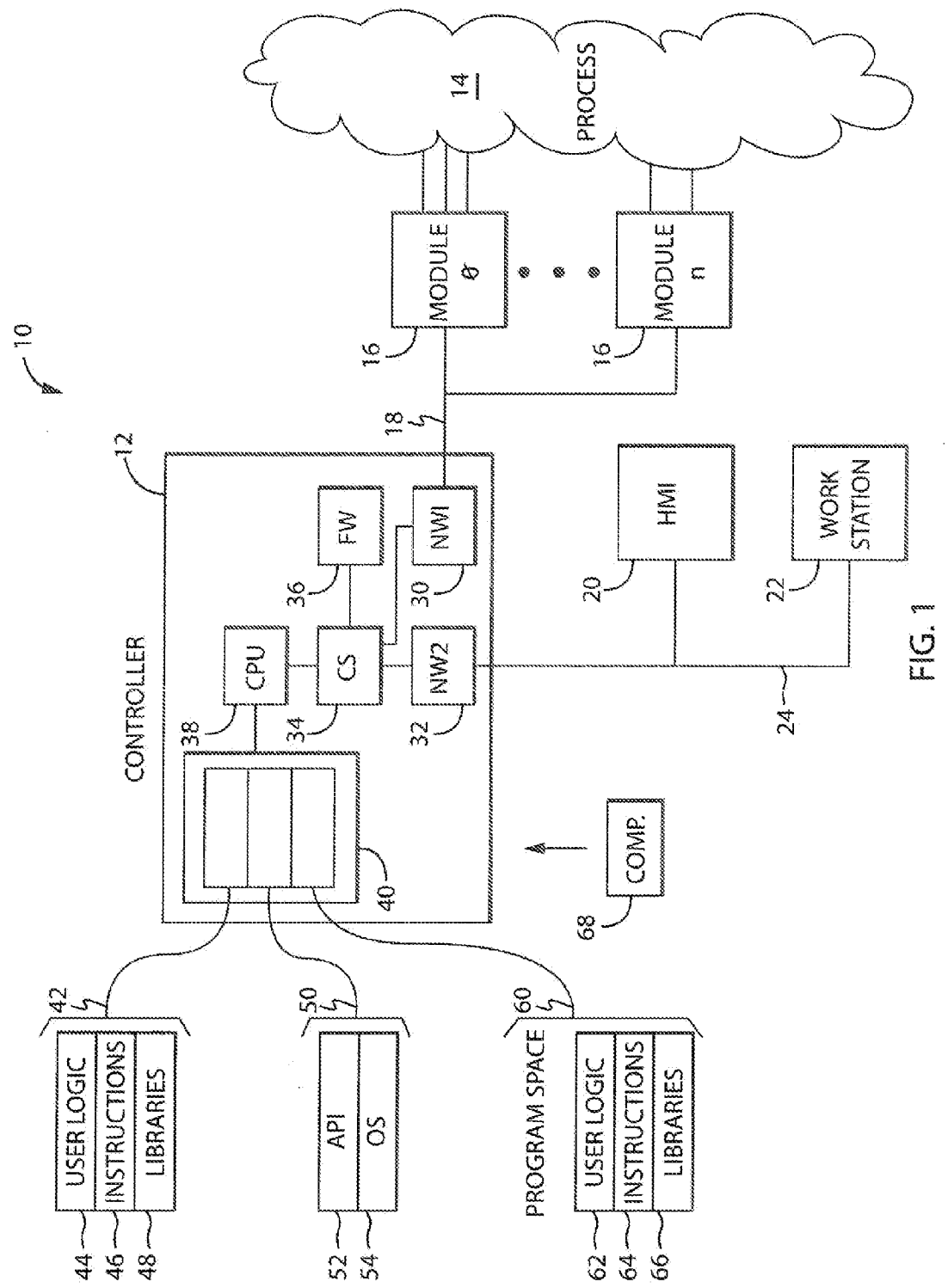
FIG. 1 is a simplified diagram of an industrial control system in accordance with an embodiment of the present invention.

Referring now to FIG. 1, a simplified diagram of an industrial control system 10 is provided in accordance with an embodiment of the present invention. The industrial control system 10 includes an industrial controller 12 executing a control program for actively controlling an industrial process 14. The industrial controller 12 may be in communication with a plurality of industrial control modules 16 (identified as modules "0" through "n") via a control network 18. The control network 18 may be suitable for highly reliable and available real-time communication by guaranteeing maximum communication delays by pre-scheduling the communication capacity of the network and/or providing redundant communication capabilities for high-availability. The control network 18 could be, for example, an EtherNet/IP, DeviceNet or ControlNet network.

The modules 16 may be input and/or output modules or devices dedicated to particular types of electrical signals and functions, for example, detecting input AC or DC signals or controlling output AC or DC signals of the industrial process 14. Each of the modules 16 may have, for example, a connector system allowing them to be installed in different combinations in a housing or rack along with other selected I/O modules or devices to match the demands of a particular application. The modules 16 may be located at convenient control points near the industrial process 14 to communicate with the industrial controller 12 via the control network 18.

The industrial controller 12 may also be in communication with various operator controlled devices, such as a Human Machine Interface ("HMI") 20 and/or a workstation 22. Such operator controlled devices could be connected to the industrial controller 12 via a second network 24 as shown (which network could also be a control network, or more typically, a standard communication network such as Ethernet). Alternatively, such operator controlled devices could be connected to the industrial controller 12 via the control network 18. The HMI 20 may provide a touchscreen display, keyboard, mouse and/or the like for providing human interaction and control over the industrial controller 12. The workstation 22 may provide a computer design environment for designing and configuring software executed by the industrial controller 12, including the control program and replacement machine-readable components.

The industrial controller 12 may include a first network interface 30 for communicating with the modules 16 via the control network 18 and a second network interface 32 for communicating with the HMI 20 and/or the workstation 22 via the second network 24. A chipset 34 of the industrial controller 12 may communicate with the first and second network interfaces 30 and 32, respectively, as well as with a firmware 36 and one or more processors 38 of the industrial controller 12. The firmware 36 may store software in a non-volatile memory, such as flash memory, to provide control, monitoring and/or data manipulation with respect to the industrial controller 12.

The processor 38 may also be in communication with a computer-readable media 40 connected to the processor 38 either directly or indirectly (such as via the chipset 34). The computer-readable media 40 could be, for example, a Random Access Memory (RAM), flash memory, magnetic media and/or optical media for holding machine-readable code. The computer-readable media 40 includes areas for storing machine readable program and data structures, such as: a first storage area 42 for holding user logic 44 (such as a control program for actively controlling the industrial process 14), instructions 46 for holding inline framework operable to be used by the control program, and/or libraries 48 for holding loadable libraries including non-volatile resources operable to be used by the control program; a second storage area 50 for holding, among other things, stand-alone runtime libraries and/or an Application Program Interface ("API") 52 defining core behavior, and an Operating System ("OS") 54; and an allocated program space 60, including for holding a copied user logic 62 (such as a copied control program or portions thereof for actively controlling the industrial process 14), copied instructions 64 and/or copied libraries 66, as will described below.

The industrial controller 12 may execute the control program in the user logic 44 for actively controlling the industrial process 14. To provide a behavioral update to the industrial controller 12, such as to correct an instruction or library having an anomaly found in the field, or to extend an instruction or library to provide greater functionality as determined in the field, a replacement machine-readable component 68 may be received by the industrial controller 12 and stored in the allocated program space 60. The replacement machine-readable component 68 may be designed to replace an earlier version machine-readable component supporting the control program in the user logic 44. The replacement machine-readable component 68 may be provided by the HMI 20, or more typically, by the workstation 22 in a design environment, and could be an instruction, library, or subroutine of the control program.

The industrial controller 12 may then locate a dependent machine-readable component having a data dependency on the earlier version machine-readable component, such as an instruction from the instructions 46 or a library from the libraries 48. The industrial controller 12 may then copy the dependent machine-readable component to the allocated program space 60 (such as to copied instructions 64 or copied libraries 66, as appropriate). The industrial controller 12 may then modify the dependent machine-readable component in the allocated program space 60 to change the data dependency on the earlier version machine-readable component to a data dependency on the replacement machine-readable component 68.

The industrial controller 12 may then copy the control program in the user logic 44 (or portions thereof) to the allocated program space 60 (such as, to copied user logic 62) along with any other essential components. The industrial controller 12 may then link the copied user logic 62 including the control program in the allocated program space 60 with the replacement machine-readable component 68 and the dependent machine-readable component in the allocated program space 60. Machine-readable components which the replacement machine-readable component 68 in turn depend on, like other components, may be resolved in the linking process in which a linker may locate unresolved references among already existing components. The industrial controller 12 may then execute the copied user logic 62 including the control program in the allocated program space 60 to verify an operation. After successfully verifying the operation, and while the control program in the user logic 44 is actively controlling the industrial process 14, the industrial controller 12 may redirect execution of the control program in the user logic 44 to execution of the control program in the copied user logic 62 in the allocated program space 60.

Figure 2:
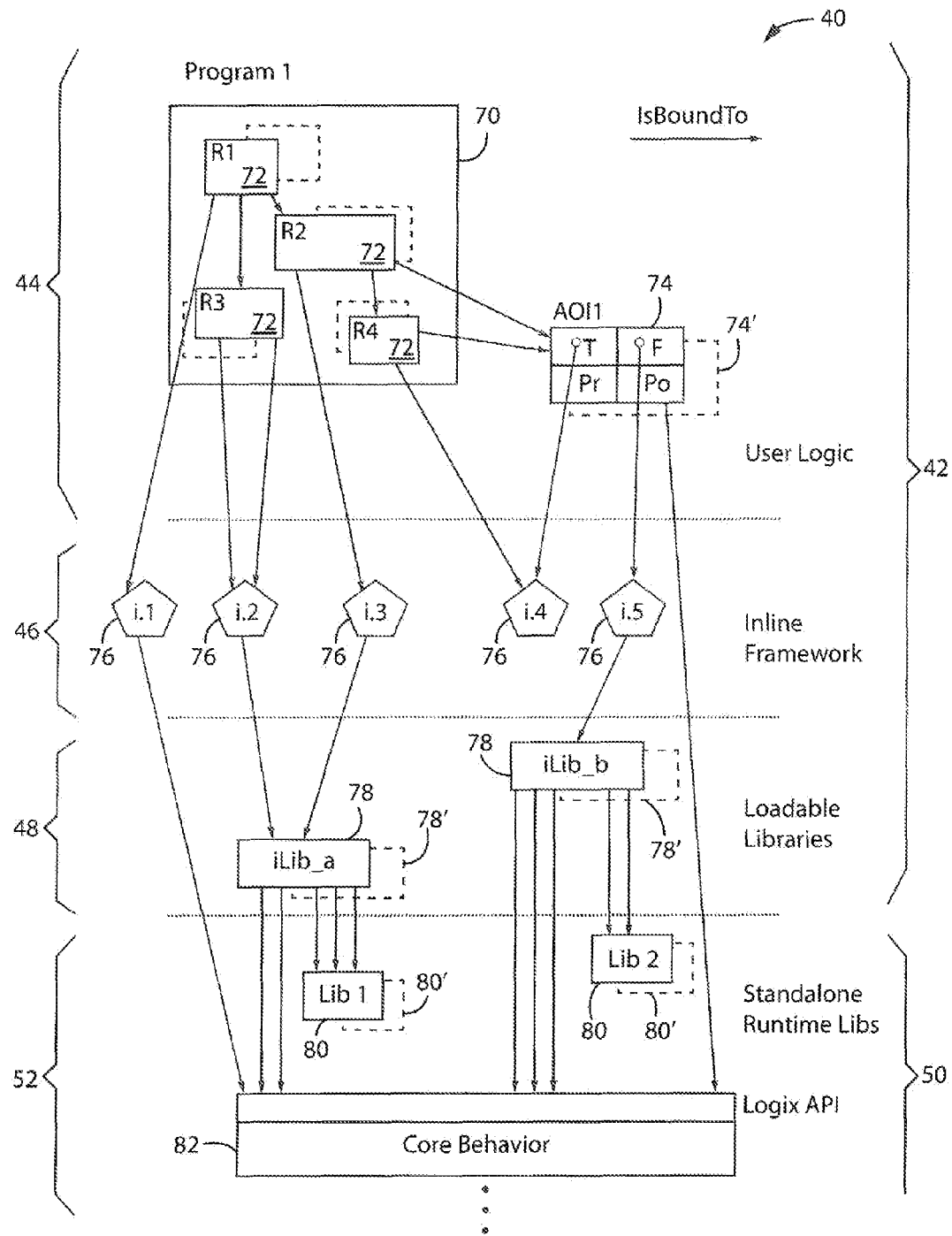
FIG. 2 is a simplified diagram of exemplar machine readable structures provided in a computer-readable media in the industrial control system of FIG. 1.

Referring now to FIG. 2, a simplified diagram of exemplar machine readable structures provided in the computer-readable media 40 of the industrial control system 10 is provided. By way of example, in the first storage area 42, user logic 44 may include a control program 70 which may consist of a machine-readable software program (identified as "Program 1") including multiple subroutines 72 (identified as "R1," "R2," "R3" and "R4"). The user logic 44 could also include an Add-On Instruction 74 (identified as "AOI 1").

Add-On Instructions are custom instructions which may be designed and created for specific industrial processes, such as the industrial process 14. Optional "scan mode" routines can be configured with Add-On Instructions to further define their behaviors. For example, Add-On Instructions could include: a True ("T") scan mode such that the instruction is scanned as a result of a true rung condition or "EnableIn" parameter being set; a False ("F") scan mode such that the instruction is scanned as a result of a false rung condition or "EnableIn" parameter not being set; a Prescan ("Pr") scan mode which may occur when the controller powers up in "Run" mode or transitions from "Program" to "Run" and/or a Postscan ("Po") scan mode which may occur as a result of an "Action" in a "Sequential Function Chart" ("SFC") routine becoming inactive. For more information about Add-On instructions, reference is made to the "Logix5000 Controllers Add On Instructions" Programming Manual. Allen-Bradley, Rockwell Automation, Inc., Pub. 1756-PM010E-EN-P—October 2014, which document is incorporated herein by reference in its entirety.

Also in the first storage area 42, instructions 46 may include multiple inline instructions 76 as part of the inline framework, such as instructions identified as "i.1." "i.3" "i.4" and "i.5." Also in the first storage area 42, libraries 48 may include multiple loadable libraries 78, such as loadable libraries identified as "iLib_a" and In the second storage area. 50, the stand-alone runtime libraries and/or API 52 may include multiple stand-alone runtime libraries 80, such as stand-alone runtime libraries identified as "Lib_1" and "Lib_2," and platform specific API's 82 defining core behavior, such as a "Logix API."

In the computer-readable media 40, certain data dependencies will exist between the various machine-readable components. As used herein, a data dependency, or data binding, occurs when a machine-readable component depends on (or refers to) another machine-readable component in order to operate. A machine-readable component having a data dependency is called a "dependent machine-readable component." Instructions (including Add-On Instructions 74 and inline instructions 76), libraries (including loadable libraries 78 and runtime libraries 80), and subroutines (including subroutines 72) could all potentially be dependent machine-readable components having data dependencies on other machine-readable components.

Various data dependencies are illustrated in FIG. 2 by way of example. For example: "iLib_b" is a dependent machine-readable component with respect to "i.5"; "Lib_1" is a dependent machine-readable component with respect to "iLib_a"; "i.4" and "i.5" are dependent machine-readable components with respect to "AOI 1"; "i.2" is a dependent machine-readable component with respect to "R3"; and so forth.

Figure 3A:
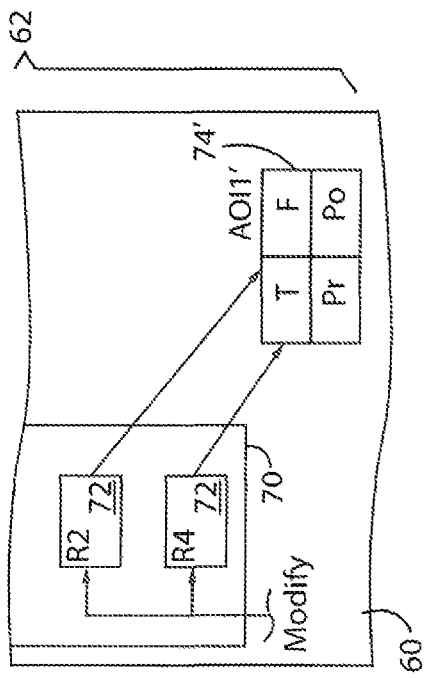
FIG. 3A is a simplified diagram illustrating modifying an instruction in an allocated program space to change a data dependency to depend on a replacement library.

Referring now to FIGS. 3A-D, various examples are provided for modifying dependent machine-readable component in the allocated program space 60 to change a data dependency on an earlier version machine-readable component to instead be a data dependency on replacement machine-readable component in accordance with an embodiment of the present invention. In FIG. 3A, a replacement machine-readable component iLib_b' (a library) is stored in the allocated program space 60. The replacement machine-readable component iLib_b' is stored to replace an earlier version machine-readable component iLib_b supporting the control program 70. The industrial controller 12 executes to locate dependent machine-readable components having a data dependency on the earlier version machine-readable component iLib_b. Accordingly, the industrial controller 12 locates dependent machine-readable component i.5 (an instruction having a data dependency on the earlier version machine-readable component iLib_b), and proceeds to copy i.5 to the allocated program space 60. The industrial controller 12 then executes to modify dependent machine-readable component i.5 to change the data dependency on the earlier version machine-readable component iLib_b to a data dependency on the replacement machine-readable component iLib_b'. The industrial controller 12 then copies the user logic 44 including the control program 70 (or portions thereof) to the allocated program space 60 (copied user logic 62 including the control program 70'), and links the copied user logic 62 and the control program 70' in the allocated program space 60 with the replacement machine-readable component iLib_b' and the dependent machine-readable component i.5 as modified. The industrial controller 12 then executes the control program of the user logic 62 in the allocated program space 60 to verify an operation. After successfully verifying the operation, and while the control program 70 is actively controlling the industrial process 14, the industrial controller 12 then redirects execution of the control program 70 to execution of the user logic 62 including the control program 70' in the allocated program space 60.

Figure 3B:
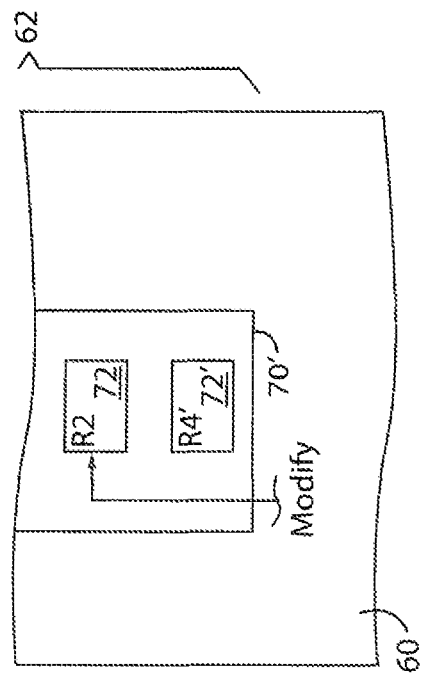
FIG. 3B is a simplified diagram illustrating modifying an Add-On Instruction in an allocated program space to change a data dependency to depend on a replacement instruction.
Figure 3C:
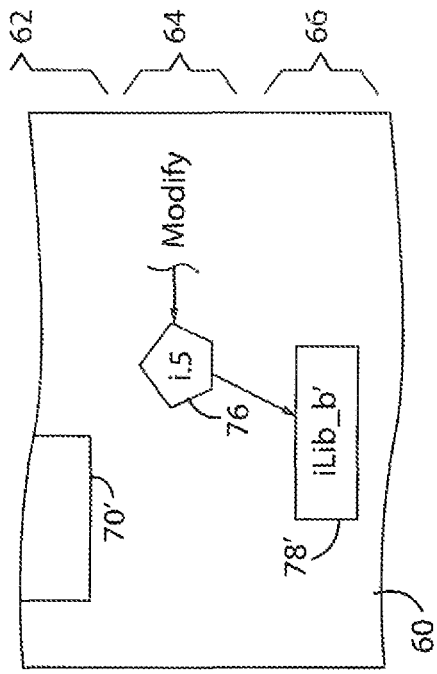
FIG. 3C is a simplified diagram illustrating modifying subroutines of the control program in an allocated program space to change data dependencies to depend on a replacement Add-On Instruction.
Figure 3D:
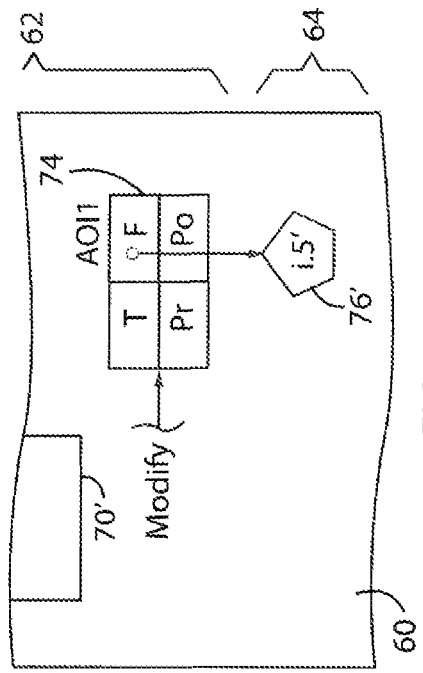
FIG. 3D is a simplified diagram illustrating modifying a subroutine of the control program in an allocated program space to change a data dependency to depend a replacement subroutine of the control program, each in accordance with an embodiment of the present invention.

FIGS. 3B-3D illustrate further examples similar to that described above with respect to FIG. 3A. In FIG. 3B, a replacement machine-readable component i.5' (an instruction) is stored in the allocated program space 60. The industrial controller 12 similarly executes to: locate dependent machine-readable component AOI 1 (an Add-On Instruction having a data dependency on the earlier version machine-readable component i.5); copy AOI 1 to the allocated program space 60; modify data dependencies of AOI 1; copy the user logic 44 including the control program 70 (or portions thereof) to the allocated program space 60 (copied user logic 62 including the control program 70'); link user logic 62 and the control program 70' with the replacement machine-readable component i.5' and the dependent machine-readable component AOI 1 as modified; verify an operation; and after successfully verifying the operation, and while the control program 70 is actively controlling the industrial process 14, redirect execution of the control program 70 to execution of the user logic 62 including the control program 70'.

In FIG. 3C, a replacement machine-readable component AOI 1' (an Add-On Instruction) is stored in the allocated program space 60. The industrial controller 12 similarly executes to locate dependent machine-readable components R2 and R4 (subroutines having data dependencies on the earlier version machine-readable component AOI 1); copy R2 and R4 to the allocated program space 60; modify data dependencies of R2 and R4; copy the user logic 44 including the control program 70 (or portions thereof) to the allocated program space 60 (copied user logic 62 including the control program 70'); link user logic 62 and the control program 70' with the replacement machine-readable component AOI 1 and the dependent machine-readable component R2 and R4 as modified; verify an operation; and after successfully verifying the operation, and while the control program 70 is actively controlling the industrial process 14, redirect execution of the control program 70 to execution of the user logic 62 including the control program 70'.

In FIG. 3D, a replacement machine-readable component R4' (a subroutine) is stored in the allocated program space 60. The industrial controller 12 similarly executes to: locate dependent machine-readable component R2 (a subroutine having data dependencies on the earlier version machine-readable component R4); copy R2 to the allocated program space 60; modify data dependencies of R2; copy the user logic 44 including the control program 70 (or portions thereof) to the allocated program space 60 (copied user logic 62 including the control program 70'); link user logic 62 and the control program 70' with the replacement machine-readable component R4' and the dependent machine-readable component R2 as modified; verify an operation; and after successfully verifying the operation, and while the control program 70 is actively controlling the industrial process 14, redirect execution of the control program 70 to execution of the user logic 62 including the control program 70'.

Figure 4:
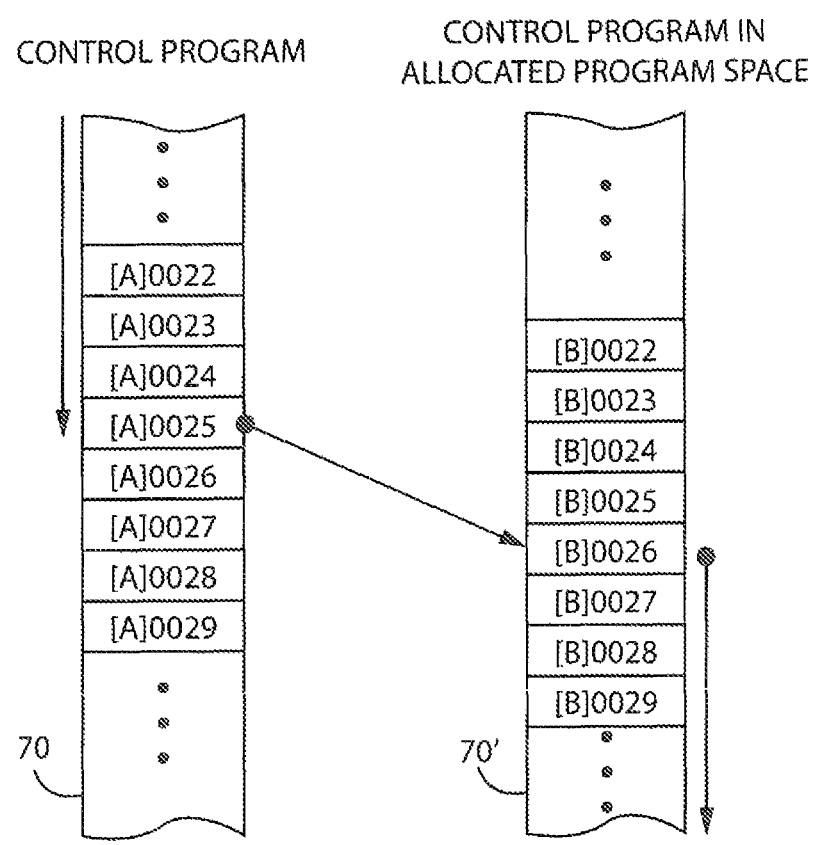
FIG. 4 is a simplified diagram illustrating redirecting execution of the control program to execution of the control program in the allocated, program space in accordance with an embodiment of the present invention.

Referring now to FIG. 4, a simplified diagram illustrating redirecting execution of the control program 70 to execution of the control program 70' in the allocated program space 60 is provided in accordance with an embodiment of the present invention. Upon storing a replacement machine-readable component, locating, copying and modifying dependent machine-readable components, and copying, linking and verifying the control program 70', the industrial controller 12 is ready to redirect execution from the control program 70 to the copied the control program 70' in the allocated program space 60. Accordingly, while the industrial controller 12 executes the control program 70 in the first storage area 42, identified with an address offset "[A]," the industrial controller 12 can schedule a next instruction in the code sequence to the control program 70' in the allocated program space 60, identified with an address offset "[B]." For example, following instruction number "0025" of the control program 70, instead of continuing to the next instruction number "0026" of the control program 70, the industrial controller 12 redirects execution to instruction number "0026" of the control program 70' as scheduled.

Figure 5:
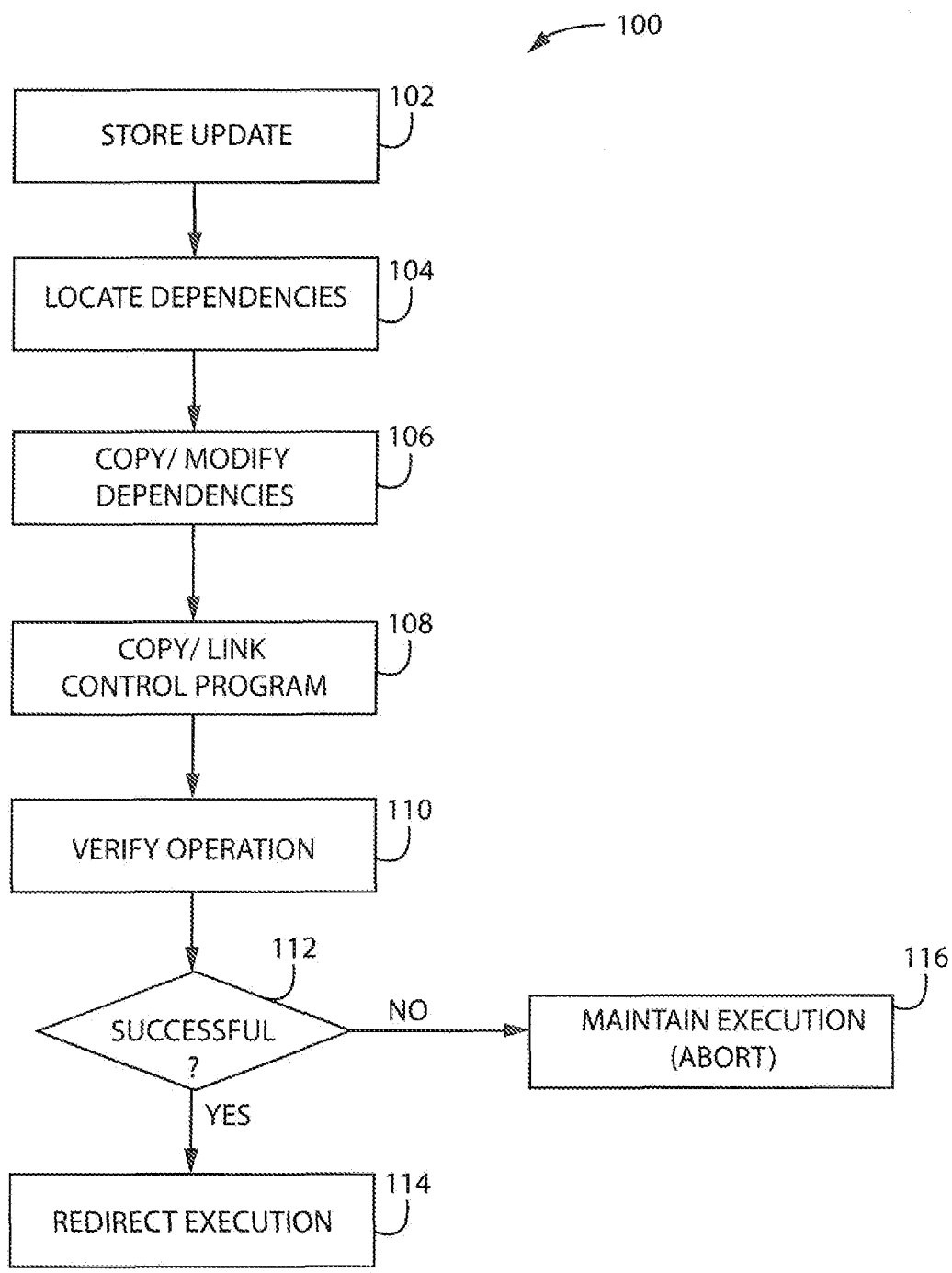
FIG. 5 is a simplified diagram flow diagram illustrating a method for updating an industrial control system executing a control program actively controlling an industrial process.

Referring now to FIG. 5, a simplified diagram flow diagram 100 illustrating a method for updating an industrial control system executing a control program actively controlling an industrial process is provided in accordance with an embodiment of the present invention. In step 102, the industrial controller receives and stores one or more replacement (first) machine-readable components in an allocated program space. The replacement (first) machine-readable components are stored for replacing corresponding earlier version (second) machine-readable components.

Next, in step 104, the industrial controller locates dependent machine-readable components having data dependencies on the earlier version (second) machine-readable components. Then, in step 106, the industrial controller copies the dependent machine-readable components to the allocated program space, and modifies the dependent machine-readable components in the allocated program space to change the data dependencies on the earlier version (second) machine-readable components to data dependencies on the replacement (first) machine-readable components.

Next, in step 108, the industrial controller copies the user logic, including the control program (or portions thereof) and/or Add-On Instructions as may be required, to the allocated program space, and links the control program (or portions thereof) in the allocated program space with the replacement (first) machine-readable components and the dependent machine-readable components in the allocated program space as modified. Machine-readable components which the replacement machine-readable component 68 in turn depend on, like other components, may be resolved in the linking process in which a linker may locate unresolved references among already existing components.

Next, in step 110, the industrial controller executes the control program in the allocated program space to verify an operation. This could be a simulated task, such as simulating one or more inputs and verifying one or more outputs are as expected. Alternatively, this could be an actual task, such as interacting with the industrial process 14 or another process and verifying one or more results are as expected.

Next, in decision step 112, after successfully verifying the operation, and while the control program is actively controlling the industrial process, the industrial controller redirects execution of the control program to execution of the control program in the allocated program space in step 114. However, if the industrial controller is unable to successfully verify the operation, or if the industrial controller is commanded to abort, the industrial controller may instead continue execution of the control program without regard to the control program in the allocated program space. In other words, the industrial controller can maintain its current execution and cancel or abort and the update.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via, wired or wireless communications with other processors, where such one or more processors can be configured to operate on one or more processor-controlled devices that can be similar or different devices. Furthermore, references to memory, unless otherwise specified, can include one or more processor readable and accessible memory elements and/or components that can be internal to the processor-controlled device, external to the processor-controlled device, and/or can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial control system comprising:
an industrial controller having a processor executing a control program stored in a memory for actively controlling an industrial process, the processor executing to:
(a) store a first machine-readable component in an allocated program space, the first machine-readable component being stored to replace a second machine-readable component supporting the control program;
(b) locate a dependent machine-readable component having a data dependency on the second machine-readable component, and copy the dependent machine-readable component to the allocated program space;
(c) modify the dependent machine-readable component in the allocated program space to change the data dependency on the second machine-readable component to a data dependency on the first machine-readable component;
(d) copy the control program to the allocated program space, and link the control program in the allocated program space with the first machine-readable component and the dependent machine-readable component in the allocated program space;
(e) execute the control program in the allocated program space to verify an operation; and
(f) after successfully verifying the operation, and while the control program is actively controlling the industrial process, redirect execution of the control program to execution of the control program in the allocated program space.

2. The industrial control system of claim 1, wherein the first and second machine-readable components are first and second libraries including non-volatile resources operable to be used by the control program.

3. The industrial control system of claim 2, wherein the dependent machine-readable component is an instruction operable to be used by the control program.

4. The industrial control system of claim 1, wherein the first and second machine-readable components are first and second instructions operable to be used by the control program.

5. The industrial control system of claim 4, wherein the first and second instructions are Add-On Instructions customized for the industrial process.

6. The industrial control system of claim 4, wherein the dependent machine-readable component is a third instruction operable to be used by the control program.

7. The industrial control system of claim 4, wherein the dependent machine-readable component is a subroutine of the control program.

8. The industrial control system of claim 4, wherein the first and second machine-readable components are first and second subroutines of the control program.

9. The industrial control system of claim 4, wherein the dependent machine-readable component is a third subroutine of the control program.

10. The industrial control system of claim 1, wherein the industrial controller executes to locate a plurality of dependent machine-readable components, each of the plurality of dependent machine-readable components having a data dependency on the second machine-readable component, and to copy the plurality of dependent machine-readable components to the allocated program space.

11. The industrial control system of claim 1, wherein the industrial control system includes firmware in communication with the control program, and the industrial controller executes to replace the second machine-readable component with the first machine-readable component without modifying the firmware.

12. A method for updating an industrial control system executing a control program actively controlling an industrial process, the method comprising:
(a) storing a first machine-readable component in an allocated program space, the first machine-readable component being stored for replacing a second machine-readable component;
(b) locating a dependent machine-readable component having a data dependency on the second machine-readable component, and copying the dependent machine-readable component to the allocated program space;
(c) modifying the dependent machine-readable component in the allocated program space to change the data dependency on the second machine-readable component to a data dependency on the first machine-readable component;
(d) copying the control program to the allocated program space, and linking the control program in the allocated program space with the first machine-readable component and the dependent machine-readable component in the allocated program space;
(e) executing the control program in the allocated program space to verify an operation; and
(f) after successfully verifying the operation, and while the control program is actively controlling the industrial process, redirecting execution of the control program to execution of the control program in the allocated program space.

13. The method of claim 12, wherein the first and second machine-readable components are first and second libraries including non-volatile resources operable to be used by the control program.

14. The method of claim 13, wherein the dependent machine-readable component is an instruction operable to be used by the control program.

15. The method of claim 12, wherein the first and second machine-readable components are first and second instructions operable to be used by the control program.

16. The method of claim 15, wherein the dependent machine-readable component is a third instruction operable to be used by the control program.

17. The method of claim 15, wherein the dependent machine-readable component is a subroutine of the control program.

18. The method of claim 12, wherein the first and second machine-readable components are first and second subroutines of the control program.

19. The method of claim 12, wherein step (b) further comprises locating a plurality of dependent machine-readable components, each of the plurality of dependent machine-readable components having a data dependency on the second machine-readable component, and copying the plurality of dependent machine-readable components to the allocated program space.

20. The method of claim 12, wherein the industrial control system includes firmware in communication with the control program, and further comprising updating the industrial control system with the first machine-readable component without modifying the firmware.

* * * * *